(12) United States Patent
Steinke et al.

(10) Patent No.: US 9,227,667 B2
(45) Date of Patent: Jan. 5, 2016

(54) STRUCTURAL COMPONENT FOR A MOTOR VEHICLE

(71) Applicant: Decoma GmbH, Sulzbach (DE)

(72) Inventors: Juergen Steinke, Koengen (DE); Robert Mohr, Weinstadt (DE)

(73) Assignee: Decoma (Germany) GmbH, Sulzbach (DE)

( * ) Notice: Subject to any disclaimer, the term of this patent is extended or adjusted under 35 U.S.C. 154(b) by 182 days.

(21) Appl. No.: 13/906,470

(22) Filed: May 31, 2013

(65) Prior Publication Data

US 2013/0320707 A1    Dec. 5, 2013

(30) Foreign Application Priority Data

May 31, 2012  (DE) .......................... 10 2012 010 768

(51) Int. Cl.
| | |
|---|---|
| B62D 25/08 | (2006.01) |
| B62D 29/04 | (2006.01) |
| B32B 5/12 | (2006.01) |
| B32B 27/34 | (2006.01) |
| B29C 70/42 | (2006.01) |
| B29L 31/30 | (2006.01) |

(52) U.S. Cl.
CPC . *B62D 25/08* (2013.01); *B32B 5/12* (2013.01); *B32B 27/34* (2013.01); *B62D 25/085* (2013.01); *B62D 29/04* (2013.01); *B29C 70/42* (2013.01); *B29L 2031/30* (2013.01); *B32B 2262/101* (2013.01); *B32B 2262/106* (2013.01); *B32B 2307/718* (2013.01); *B32B 2605/08* (2013.01)

(58) Field of Classification Search
CPC .... B62D 29/04; B62D 29/041; B62D 29/043; B62D 29/046; B62D 29/048; B62D 25/08; B62D 25/085
USPC ........................... 296/193.09, 203.02, 901.01
See application file for complete search history.

(56) References Cited

U.S. PATENT DOCUMENTS

| | | | | |
|---|---|---|---|---|
| 6,273,496 B1 * | 8/2001 | Guyomard et al. | ...... | 296/193.09 |
| 6,293,615 B1 * | 9/2001 | Tarahomi | ................ | 296/193.09 |
| 6,412,855 B1 * | 7/2002 | Cantineau et al. | ....... | 296/187.01 |
| 6,464,289 B2 * | 10/2002 | Sigonneau et al. | ...... | 296/193.09 |
| 6,805,400 B2 * | 10/2004 | Bruderick et al. | ........ | 296/193.09 |
| 6,877,797 B2 * | 4/2005 | Henderson et al. | ...... | 296/203.02 |
| 8,197,108 B2 * | 6/2012 | Eckert et al. | .................. | 362/505 |
| 8,308,225 B2 * | 11/2012 | Owen et al. | .............. | 296/193.09 |
| 8,313,138 B2 * | 11/2012 | Guyomard et al. | ...... | 296/193.09 |
| 8,517,461 B2 * | 8/2013 | Huber | ...................... | 296/203.02 |
| 8,567,853 B2 * | 10/2013 | Huber et al. | .............. | 296/193.09 |
| 8,814,255 B2 * | 8/2014 | Yamaji et al. | ............. | 296/193.07 |
| 8,882,183 B2 * | 11/2014 | Suzuki et al. | ............. | 296/203.01 |
| 8,894,132 B2 * | 11/2014 | Goettker et al. | ......... | 296/203.01 |

(Continued)

FOREIGN PATENT DOCUMENTS

| | | |
|---|---|---|
| DE | 3535272 A1 | 4/1987 |
| DE | 10205965 A1 | 9/2003 |

(Continued)

*Primary Examiner* — Gregory Blankenship
(74) *Attorney, Agent, or Firm* — Jordan IP Law, LLC; Todd A. Vaughn

(57) ABSTRACT

A structural component for a motor vehicle which is mountable in the front or rear region of the vehicle. The structural component is composed of plastic and is manufactured as a moulded part, and which includes in at least partial regions thereof two or more fabric layers which are overmoulded with a thermoplastic polymer.

14 Claims, 4 Drawing Sheets

(56) References Cited

U.S. PATENT DOCUMENTS

| | | | |
|---|---|---|---|
| 8,911,005 B2* | 12/2014 | Townson et al. | 296/193.09 |
| 8,931,824 B2* | 1/2015 | Lopez et al. | 296/187.04 |
| 2001/0033923 A1* | 10/2001 | Mulder et al. | 428/295.1 |
| 2006/0141884 A1* | 6/2006 | Haque | 442/361 |
| 2006/0163910 A1* | 7/2006 | Behr | 296/181.2 |
| 2008/0001429 A1* | 1/2008 | Willis et al. | 296/181.2 |
| 2008/0217961 A1* | 9/2008 | Lustiger et al. | 296/193.09 |
| 2009/0280329 A1* | 11/2009 | Rukavina et al. | 428/412 |
| 2010/0092744 A1* | 4/2010 | Soundararajan et al. | 428/213 |
| 2012/0280536 A1* | 11/2012 | Malek et al. | 296/193.09 |
| 2012/0282429 A1* | 11/2012 | DiNello et al. | 428/71 |
| 2013/0234472 A1* | 9/2013 | Diaz Sanchez et al. | 296/193.09 |
| 2013/0313862 A1* | 11/2013 | Yamaji et al. | 296/203.01 |
| 2013/0313863 A1* | 11/2013 | Yamaji et al. | 296/203.01 |
| 2013/0320707 A1* | 12/2013 | Steinke et al. | 296/187.01 |
| 2014/0210233 A1* | 7/2014 | Brymerski et al. | 296/191 |
| 2014/0300138 A1* | 10/2014 | Gonda et al. | 296/187.12 |
| 2014/0350413 A1* | 11/2014 | Rizzo | 600/479 |

FOREIGN PATENT DOCUMENTS

| | | |
|---|---|---|
| DE | 10332969 A1 | 2/2005 |
| DE | 202006019341 U1 | 3/2007 |
| DE | 102008026977 A1 | 4/2009 |
| DE | 102008026977 A1 | 12/2009 |
| DE | 102010012123 A1 | 12/2010 |
| EP | 1112915 A1 | 7/2001 |
| EP | 1581380 A1 | 10/2005 |
| EP | 2028082 A1 | 2/2009 |
| WO | 9952703 A1 | 10/1999 |
| WO | 03008256 A1 | 1/2003 |
| WO | 2004024424 A1 | 3/2004 |

* cited by examiner

STRUCTURAL COMPONENT FOR A MOTOR VEHICLE

CROSS-REFERENCE TO RELATED APPLICATIONS

The present application claims priority under 35 U.S.C. §119 to German Patent Application No. DE 10 2012 010 768.4 (filed on (May 31, 2012), which is hereby incorporated by reference in its entirety.

TECHNICAL FIELD

A structural component for a motor vehicle, such as a mounting bracket configured to be mounted at the front or rear region of the vehicle. The structural component is composed of a material such as plastic and is manufactured as a moulded part. The structural component includes in at least partial regions two or more fabric layers which are overmoulded with a thermoplastic polymer.

BACKGROUND

In modern motor vehicles, the radiator grille and the auxiliary components located spatially behind it, such as, for instance, the heat exchanger of the engine cooling system, are not directly mounted on the vehicle structure but on a supporting structure mounted thereon, which is typically referred to as a mounting bracket. This offers the advantage known per se that different engine variants with different auxiliary components can be implemented without any change to the vehicle structure. Moreover, the mounting bracket simplifies the pre-assembly of the radiator module and may in a suitable embodiment also save weight in comparison with direct mounting.

Known mounting brackets are disclosed in the official publications DE 10 2008 026 977 A1 and DE 10 2010 012 123 A1. DE 10 2008 026 977 A1, in particular, describes how the mounting bracket is connected to the vehicle structure in a customary manner, and discloses a mounting bracket made of plastic, which besides a saving in weight also offers advantages in manufacture.

The aforementioned documents further disclose that the customary mounting brackets are, from a point of view of cost consideration, advantageously made from fibre-reinforced polymer material in an injection moulding process. In addition, they and the further document DE 20 2006 019 341 U1 describe that sheet metal structures or blanks made from so-called organometallic sheet may be embedded as reinforcements in highly stressed areas of the injection moulded polymer material of the conventional mounting brackets. The term organometallic sheet here refers to a textile surface structure soaked in a thermoplastic synthetic resin. The surface structure may, in particular, be a fabric or non-woven made from natural, carbon, glass or mineral fibres. The thermoplastic property of the synthetic resin allows that the thus formed matrix can be softened by means of heating and that the organometallic sheet, which is typically flat in its shipping state, can be remoulded into a contoured shape by means of compression moulding after having been heated to its softening temperature. As suggested by the name of the basic material, a similarity with the drawing or forming of sheet metal exists in the context of its processing and the shapes thus achievable.

DE 10332969 A1 discloses a module support made from a fibre composite plastic. This module support is formed by compression moulding and at least partially consists of fabric layers. The entire component is reinforced by means of a fabric layer of continuous filaments and, depending on requirements, receives additional reinforcements by way of fibre inserts.

DE 1020596581 discloses a construction element made from fibre reinforced plastic. The element comprises a multiple-layer construction with different types of fibres and different fibre orientations and a hollow core. The individual components here are always overmoulded with a simple plastic.

SUMMARY

Embodiments relate to a structural component of enhanced design as compared with the known embodiments.

In accordance with embodiments, a structural component for a motor vehicle includes a mounting bracket which is mountable in a front or rear region of the vehicle. The structural component is composed of a plastic material and is manufactured as a moulded part. In at least partial regions the structural component has two or more fabric layers which are overmoulded with a thermoplastic polymer, and in which a polymer surrounding the fabric layers comprises glass fibres.

In accordance with embodiments, a structural component for a motor vehicle includes at least two fabric layers which are overmoulded with a thermoplastic polymer to form a thus form a multilayer structure, in which a polymer surrounding the fabric layers comprises glass fibres.

In accordance with embodiments, a structural component for a motor vehicle includes: a mounting bracket composed of plastic and in which partial regions thereof. The multi-layered structure includes: an upper fiber layer composed of glass fibers; a lower fiber layer composed of glass fibers; an intermediate fiber layer composed of carbon fibers provided between the upper fiber layer and the lower fiber layer; an upper thermoplastic polymer layer over the upper fiber layer; a lower thermoplastic polymer layer under the lower fiber layer; a first intermediate thermoplastic polymer layer between the upper fiber layer and the intermediate fiber layer; and a second intermediate thermoplastic polymer layer between the lower fiber layer and the intermediate fiber layer.

The structural component comprises a plurality of fabric layers which are overmoulded with a thermoplastic polymer. In accordance with embodiments, PA 6 GF35 (polyamide 6 with 35% glass fibre) is used as the thermoplastic polymer. Alternatively, other materials may be used in the overmoulding, for instance PP, PA, in each case with or without a filler.

The fabric layers may be composed of the same material, for instance, glass fibre or carbon fibre. Depending on the intended strength, different layers may also be applied, alternating between GF and carbon. Ultimately, it is also possible for fabric layers of the same material but with different orientations of fibres and/or of fabrics to be applied. This means that a different orientation of warp/weft is selected for successive fabric layers.

The structural component in accordance with embodiments comprises a different construction in its individual parts. In this way, the strength requirements can be specifically met, at the same time saving both material and weight in areas that are less stressed. The appropriate combination of GF/CRP is calculated on the basis of a stress simulation conducted earlier.

The differently selected and shaped GF/CRP insert parts make possible a lightweight construction which completely dispenses with metal components. As a result, an otherwise necessary anti-corrosion coating, in particular, becomes obsolete. Ultimately, a metal-free construction also offers an improvement in the electromagnetic behaviour, the absence of any reciprocal effect means that there is less interference with the sensors located in the front end of the vehicle and/or allows them to be operated using less power. Overall, an environment which is more favourable to the vehicle sensor system is created.

DRAWINGS

Embodiments are described by way of example below with reference to the drawings.

DESCRIPTION

Figure 1:
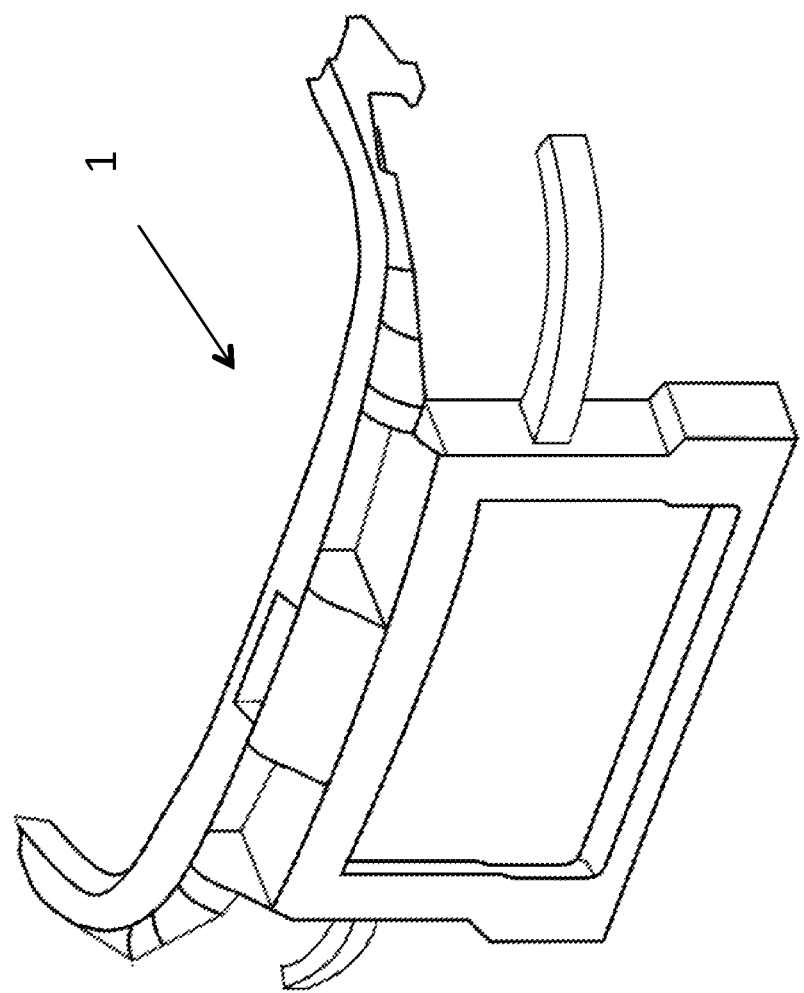
FIG. 1 illustrates a perspective view of a mounting bracket provided at the front end of a motor vehicle.

The mounting bracket 1, which is embodied in one piece, is composed of plastic with integrated reinforcement parts, and indeed, advantageously has no metallic insert parts at all. The mounting bracket 1 made in one piece includes a frame section 2, an upper transverse section, which is attached to the top of the frame section 2, and two struts which extend from approximately the centre of the frame section 2 in both directions. The mounting bracket 1 is illustrated in its entirety in FIG. 1, that is to say with all the reinforcement and/or insert parts yet to be illustrated in greater detail.

Figure 2:
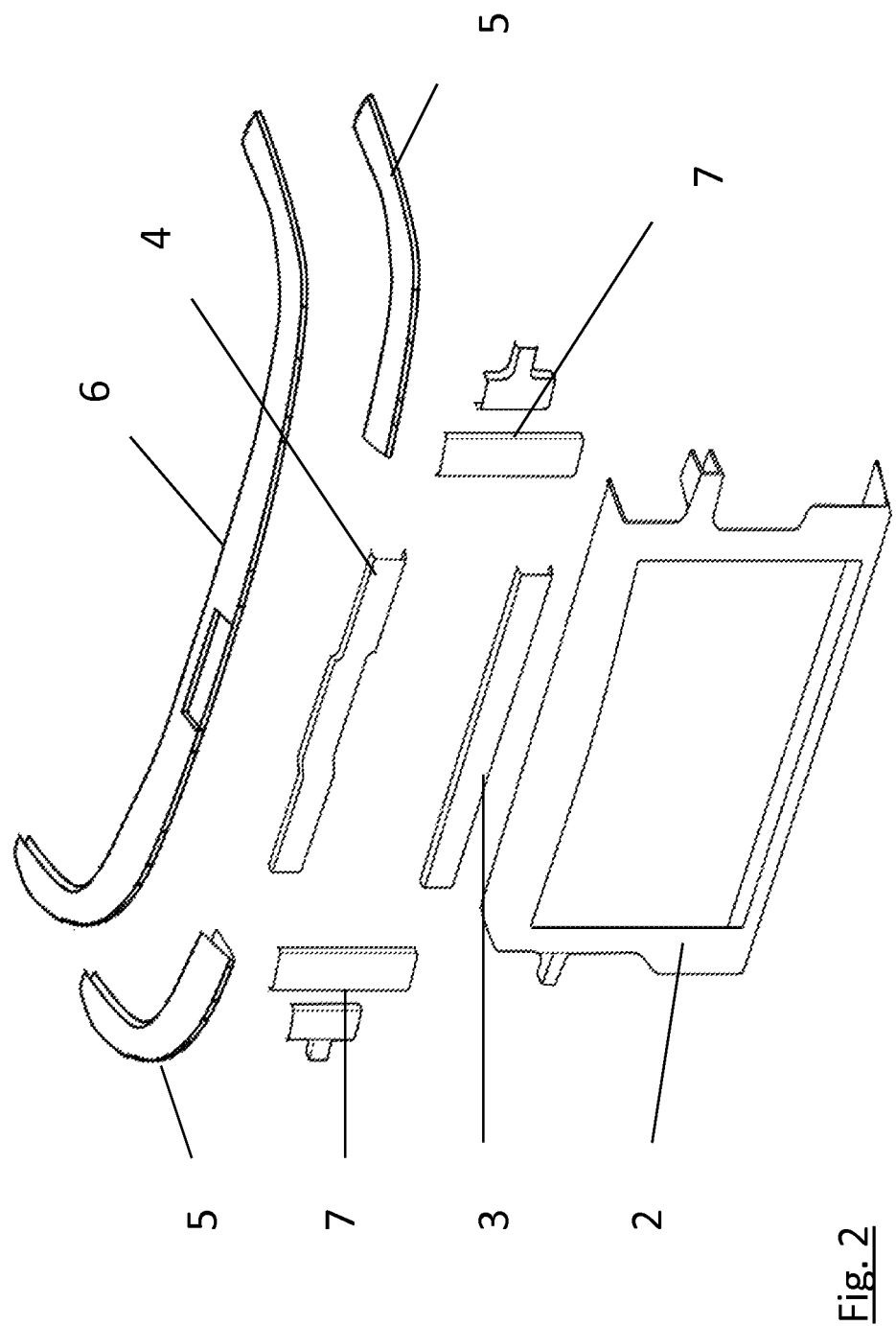
FIG. 2 illustrates an exploded view of the individual insert parts for the mounting bracket of FIG. 1.

As illustrated in FIG. 2, the individual insert parts for the mounting bracket 1 includes the frame section 2, the lower brace 3, the centre section of the upper brace (upper transverse section) 4, the left and right lateral sections 5 of the upper brace, the one-piece upper brace 6, the upper section of the upper transverse section, and the vertical struts 7 located laterally on the left and right of the frame section, are reinforced and/or embodied as insert parts. The named parts, being insert parts, are inserted into a mould which corresponds to the shape of the finished mounting bracket 1 illustrated in FIG. 1 and overmoulded or inserted into a prefabricated plastic component and bonded to the prefabricated plastic component by way of overmoulding.

Figure 3:
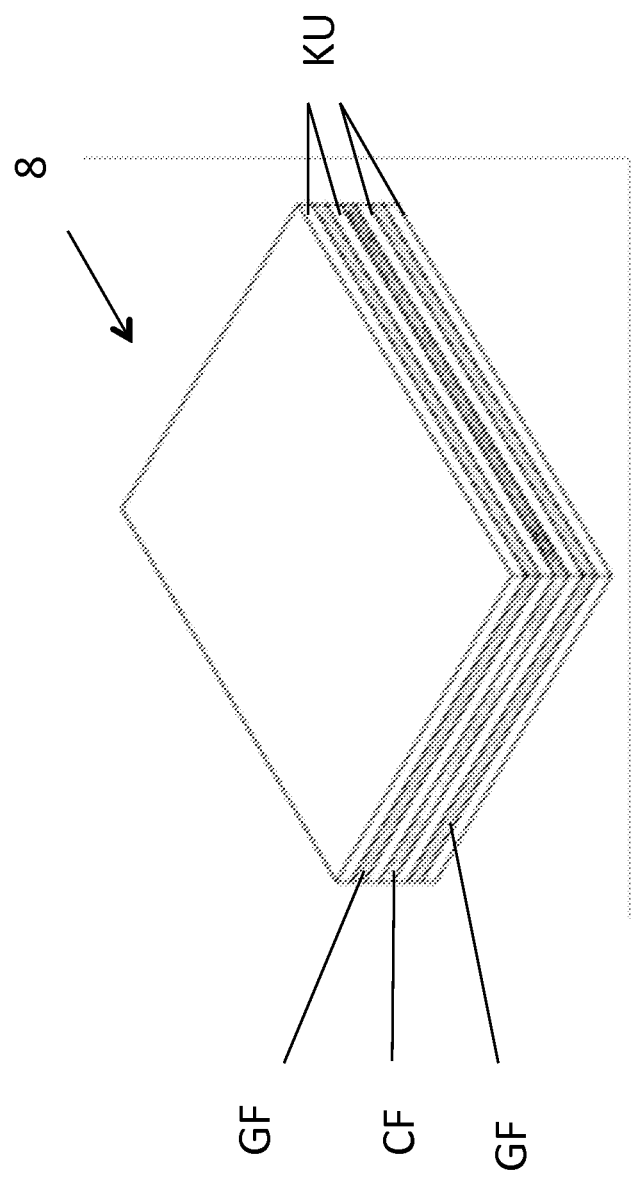
FIG. 3 illustrates a cross-section of the multi-layered construction of an insert part.

As illustrated in FIG. 3, a cross-section of the multi-layered construction of an insert part 8 is provided. In the example illustrated, the insert part is formed by a plurality of (e.g., three) fabric layers which are overmoulded with a total of four layers KU of a thermoplastic polymer (for instance PA 6 GF35). The upper and the lower fabric layer is composed of a glass fibre GF, the centre layer is composed of carbon fibre CF. A layer each of the thermoplastic polymer KU is located between these layers and respectively as a top and bottom final layer.

Figure 4:
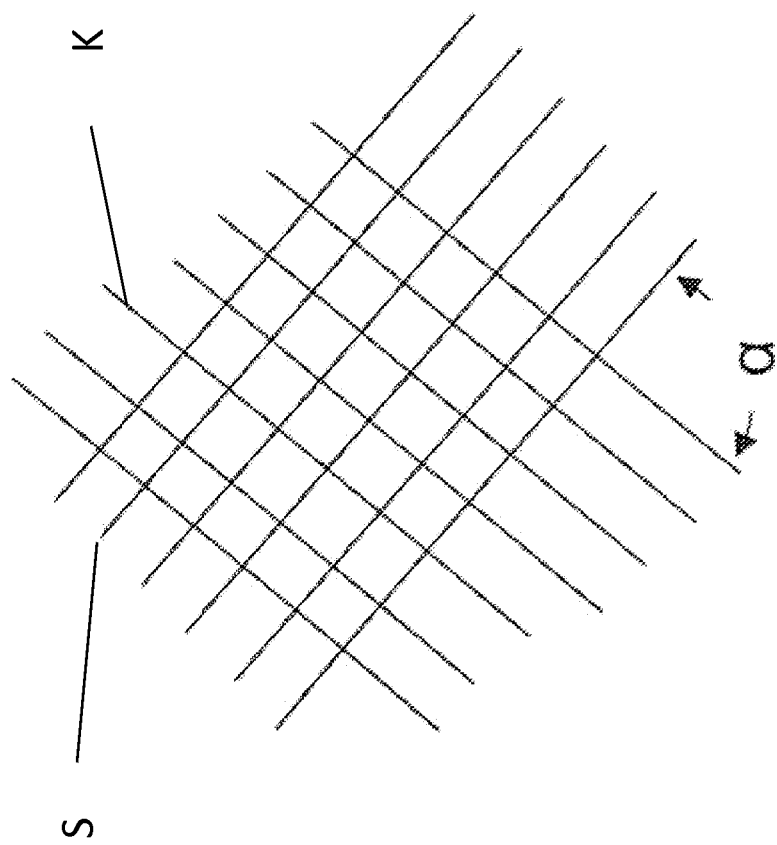
FIG. 4 illustrates the relative orientation of the warp and weft threads to one another.

As illustrated in FIG. 4, the relative orientation of the warp and weft threads K,S to one another is provided. It is usual in this context for the angle α between warp and weft threads K,S to be 90°, with a fabric having an angle between the warp and weft threads K,S deviating from 90° also being usable. With reference to the layered construction illustrated in FIG. 3, it is possible for the orientation of threads and/or the angle between the warp and weft threads K,S to be different in successive fabric layers. This is implemented with the objective of homogenizing the anisotropic material properties of the individual fabric layers in their entirety and/or of creating a preferred direction of stiffness, such as a specified bending point, at certain locations, for instance with a view to providing a predetermined direction of deformation in the event of a crash.

The insert parts illustrated in FIG. 2 may be embodied as described in the following according to the predefined requirements.

The three-piece upper brace (the upper transverse section) includes a left and a right lateral section 5 and a centre section 4. The lateral sections 5 comprise only layers of glass fibre GF in their layered construction, the centre section 4 has a layered construction consisting of a combination of materials. The outer layers are glass fibre GF, the centre layer is carbon fibre CF.

The upper brace 4, 5, 6 is embodied as a single section or multiple sections. All sections and the vertical struts 7 include a material combination of glass fibre GF and carbon fibre CF, which is indeed variable with reference to layer thickness and layer sequence.

The insert parts of the mounting bracket 1 may, in terms of their layered construction, completely consist of carbon fibre CF or of glass fibre GF. Ultimately, the different insert parts may also be embodied in different ways, as described above.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

1 Mounting bracket
2 Frame section
3 Lower brace
4 Centre section of upper brace
5 Lateral sections of upper brace
6 One-piece upper brace, upper part of upper transverse section
7 Vertical strut
8 Insert part
GF Glass fibre
CF Carbon fibre
KU Polymer overmoulding, thermoplastic polymer
S Weft thread, direction of weft
K Warp thread, direction of warp

What is claimed is:

1. A structural component for a motor vehicle, comprising:
a mounting bracket composed of a single piece which is mountable on the motor vehicle, and which includes a plurality of insert parts including an upper brace having a left lateral section, a right lateral section and a centre section, the insert parts having in partial regions thereof a multi-layer structure including a plurality of fabric layers which are overmoulded with a plurality of thermoplastic polymer layers, the fabric layers including an upper fabric layer, a lower fabric layer, and a center fabric layer between the upper fabric layer and the lower fabric layer, and the thermoplastic polymer layers include an upper and lower thermoplastic polymer layer surrounding the fabric layers, and intermediate thermoplastic polymer layers located between the upper and lower thermoplastic polymer layers and the fabric layers, respectively, wherein:
- the upper fabric layer, the lower fabric layer, and the center fabric layer of the left lateral section comprise only glass fibre;
- the upper fabric layer, the lower fabric layer, and the center fabric layer of the right lateral section comprise only glass fibre; and
- the upper fabric layer and the lower fabric layer of the centre section comprises glass fibre, and the center fabric layer of the centre section comprises carbon fibre.

2. The structural component of claim 1, wherein the layers in the multi-layer structure differ in material thickness with respect to each other.

3. The structural component of claim 1, wherein each layer in the multi-layer structure differ in orientation with respect to each other in reference to directions of warp and weft.

4. The structural component of claim 3, wherein an angle between warp and weft threads is 90°.

5. The structural component of claim 1, wherein the thermoplastic polymer layers is based on a polyamide.

6. A structural component for a motor vehicle, comprising:
- a mounting bracket which is mountable on the motor vehicle, the mounting bracket being composed of a single piece and which includes a plurality of insert parts having an upper brace with a left lateral section, a right lateral section and a centre section, the insert parts each having a multi-layer structure including a plurality of fabric layers which are overmoulded with a plurality of thermoplastic polymer layers, wherein:
- the fabric layers of the left lateral section and the right lateral section comprise only glass fibre;
- the fabric layers of the right lateral section comprise only glass fibre; and
- the fabric layers of the centre section comprises glass fibre and carbon fibre.

7. The structural component of claim 6, wherein the layers in the multi-layer structure differ in material thickness with respect to each other.

8. The structural component of claim 6, wherein each layer in the multi-layer structure differ in orientation with respect to each other in reference to directions of warp and weft.

9. The structural component of claim 8, wherein an angle between warp and weft threads is 90°.

10. The structural component of claim 6, wherein the thermoplastic polymer layers is based on a polyamide.

11. A structural component mountable on a motor vehicle, comprising:
- a mounting bracket composed of a single piece and which includes a plurality of insert parts having a frame section, a lower brace, and an upper brace with a left lateral section, a right lateral section and a centre section, the insert parts each having a multi-layer structure including a plurality of fabric layers which are overmoulded with a plurality of thermoplastic polymer layers, wherein:
- the fabric layers of the left lateral section and the right lateral section comprise only glass fibre;
- the fabric layers of the right lateral section comprise only glass fibre; and
- the fabric layers of the centre section comprises glass fibre and carbon fibre.

12. The structural component of claim 11, wherein the layers in the multi-layer structure differ in material thickness with respect to each other.

13. The structural component of claim 11, wherein each layer in the multi-layer structure differ in orientation with respect to each other in reference to directions of warp and weft.

14. The structural component of claim 13, wherein an angle between warp and weft threads is 90°.

* * * * *